US008998695B2

(12) United States Patent
Muir et al.

(10) Patent No.: US 8,998,695 B2
(45) Date of Patent: Apr. 7, 2015

(54) CASHLESS RESERVATION SYSTEM

(75) Inventors: Robert Linley Muir, Rosebery (AU); David Curry, Portland, OR (US); Louis Lui, Rosebery (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 11/754,065

(22) Filed: May 25, 2007

(65) Prior Publication Data

US 2008/0039193 A1 Feb. 14, 2008

Related U.S. Application Data

(63) Continuation of application No. 11/441,315, filed on May 25, 2006, now abandoned, which is a continuation-in-part of application No. 10/561,486, filed as application No. PCT/AU2004/000799 on Jun. 18, 2004, now Pat. No. 8,795,051.

(30) Foreign Application Priority Data

May 25, 2006 (AU) ................................ 2006902818
Apr. 2, 2007 (AU) ................................ 2007901726

(51) Int. Cl.
*A63F 9/00* (2006.01)
*A63F 13/00* (2014.01)
*G06F 17/00* (2006.01)
(Continued)

(52) U.S. Cl.
CPC ............ *G07F 17/32* (2013.01); *G07F 17/3239* (2013.01); *G07F 17/3255* (2013.01); *G07F 17/3262* (2013.01)

(58) Field of Classification Search
USPC ................................................ 463/20, 16, 42
See application file for complete search history.

(56) References Cited

U.S. PATENT DOCUMENTS 4,636,951 A * 1/1987 Harlick ........................... 463/25
5,265,874 A * 11/1993 Dickinson et al. .............. 463/25
5,429,361 A * 7/1995 Raven et al. .................... 463/25
(Continued)

FOREIGN PATENT DOCUMENTS

AU 199924974 B2 11/1999
EP 0534718 A2 3/1993
(Continued)

OTHER PUBLICATIONS

Statement of Grounds and Particulars in Support of Opposition, in the Matter of Australian Patent Application 2004248208 in the name of Aristocrat Technologies Australia Pty Ltd and Opposition thereto by IGT, dated May 29, 2008, 20 pages.
(Continued)

*Primary Examiner* — Reginald Renwick
(74) *Attorney, Agent, or Firm* — McAndrews, Held & Malloy, Ltd.

(57) ABSTRACT

A gaming system having a server connected to a plurality of gaming machines for playing a game in which a player wagers credits held in a credit meter. The gaming machines having a player tracking apparatus to receive an identifier from a current player of the gaming machine. The gaming machine can be reserved by a player, in which case play of the gaming machine is prevented by any player other than a player with the same identifier for a predetermined period time. The ability to reserve gaming machines may be dependent on eligibility criteria.

12 Claims, 10 Drawing Sheets

180

(51) Int. Cl.
*G06F 19/00* (2011.01)
*G07F 17/32* (2006.01)

(56) References Cited

U.S. PATENT DOCUMENTS

| | | | | |
|---|---|---|---|---|
| 5,547,202 | A * | 8/1996 | Tsumura | 463/29 |
| 5,586,936 | A | 12/1996 | Bennett et al. | |
| 5,800,269 | A * | 9/1998 | Holch et al. | 463/42 |
| 5,952,640 | A | 9/1999 | Lucero | |
| 5,954,583 | A * | 9/1999 | Green | 463/29 |
| 6,012,983 | A * | 1/2000 | Walker et al. | 463/20 |
| 6,162,122 | A | 12/2000 | Acres et al. | |
| 6,511,377 | B1 | 1/2003 | Weiss | |
| 6,523,829 | B1 * | 2/2003 | Walker et al. | 273/292 |
| 6,743,098 | B2 | 6/2004 | Urie | |
| 6,843,725 | B2 * | 1/2005 | Nelson | 463/40 |
| 6,846,238 | B2 * | 1/2005 | Wells | 463/39 |
| 6,896,618 | B2 * | 5/2005 | Benoy et al. | 463/25 |
| 2001/0050311 | A1 | 12/2001 | Avellino | |
| 2002/0070275 | A1 | 6/2002 | Mullins et al. | |
| 2002/0132660 | A1 * | 9/2002 | Taylor | 463/16 |
| 2002/0155887 | A1 | 10/2002 | Criss-Puszkiewicz et al. | |
| 2002/0160834 | A1 | 10/2002 | Urie et al. | |
| 2003/0054881 | A1 * | 3/2003 | Hedrick et al. | 463/29 |
| 2003/0220138 | A1 | 11/2003 | Walker et al. | |
| 2004/0053684 | A1 | 3/2004 | Chudd et al. | |
| 2005/0143166 | A1 * | 6/2005 | Walker et al. | 463/25 |
| 2006/0111168 | A1 * | 5/2006 | Nguyen et al. | 463/16 |
| 2008/0132308 | A1 | 6/2008 | Muir | |

FOREIGN PATENT DOCUMENTS

| | | |
|---|---|---|
| EP | 0589545 | 3/1994 |
| WO | 94/12953 | 6/1994 |
| WO | 98/12648 | 3/1998 |
| WO | WO 2008/127870 | 10/2008 |

OTHER PUBLICATIONS

Statement of Grounds and Particulars in Support of Opposition in the Matter of Australian Patent Application 2007202381 in the name of Aristocrat Technologies Australia Pty Ltd and Opposition thereto by IGT, dated Sep. 8, 2008, 24 pages.
Written Opinion of the International Searching Authority corresponding to International Application Serial No. PCT/AU2004/000799, mailed Jul. 28, 2004.
International Search Report and Written Opinion corresponding to International Application Serial No. PCT/AU2004/000799, mailed Jul. 28, 2004.
USPTO Office Action, U.S. Appl. No. 11/441,315, mail date of May 14, 2008.
USPTO Office Action, U.S. Appl. No. 11/441,315, mail date of Mar. 18, 2009.
USPTO Office Action, U.S. Appl. No. 11/441,315, mail date of Sep. 15, 2009.
USPTO Office Action, U.S. Appl. No. 10/561,486, mail date of May 28, 2008.
USPTO Office Action, U.S. Appl. No. 10/561,486, mail date of Apr. 1, 2009.
USPTO Office Action, U.S. Appl. No. 10/561,486, mail date of Sep. 15, 2009.
Examiner's First Report corresponding to Australian Patent Application No. 2008201645, dated Feb. 23, 2009.

* cited by examiner

CASHLESS RESERVATION SYSTEM

RELATED APPLICATIONS

This application claims priority as a continuation to U.S. application Ser. No. 11/441,315, filed on May 25, 2006, now abandoned, as well as to Australian patent application serial number 2006902818, filed on May 25, 2006, and Australian patent application serial number 2007901726, filed on Apr. 2, 2007, and as a continuation-in-part of U.S. application Ser. No. 10/561,486, now U.S. Pat. No. 8,795,051, having a 371 date of Oct. 18, 2006, which is a National Phase entry of International Application No. PCT/AU04/000799, filed on Jun. 18, 2004, and claims priority to Australian Patent Application No. 2003903111, filed Jun. 19, 2003, each of which is herein incorporated by reference in its entirety.

INTRODUCTION

The present invention relates generally to the field of gaming apparatus and machines and in particular the invention relates to cashless networked gaming systems.

BACKGROUND OF THE INVENTION

A line-of-sight gaming system operates with cashless transfers between a cashier and gaming machines. A player gives money to a cashier who instructs the system to place credits on the players selected machine. The gaming machine is (or should be) in the cashier's line-of-sight so they can see the machine is not currently being played and that once the player has paid that no one else uses the machine.

A disadvantage of these systems is that the number of machines on the gaming floor is limited to those visible to the cashier.

Gaming machines may have a reservation button, enabling players to reserve a gaming machine for their use. The player presses the reserve button and the gaming machine enters the reserve mode, and displays a reserve message. When the reserve button is pressed again the machine exits the reserve mode.

U.S. Pat. No. 5,429,361 describes a gaming system in which a magnetic card is used as a reservation lock. This patent describes a traditional gaming system using magnetic cards, where the reserve key only works when the player's magnetic card is inserted. If they press reserve, then remove their card the machine cannot be unreserved until the card is reinserted. After a predetermined timeout period the machine will automatically unreserve. This is ideal for players to take short breaks without the possibility of someone else stealing their money.

Any reference in this specification to the prior art does not constitute, nor should it be considered, an admission that such prior art was widely known or forms part of the common general knowledge in Australia, or in any other jurisdiction, before the priority date of any of the appended claims.

SUMMARY OF THE INVENTION

According to a first aspect of the invention, there is provided a gaming system comprising a server system communicably connected to a plurality of gaming machines, the gaming machines providing a game in which a player stakes a wager on the game and a plurality of symbols are selected and displayed on a display, and if a winning combination occurs during play of the game, the gaming machine awards an award, wherein the user interface of the gaming machines comprises means to receive an identifier from a current player of the gaming machine and the gaming machine communicates with the server system to provide access to a player account associated with the identifier and maintained by the server system, wherein upon certain operation of the user interface by the current player, the server system determines eligibility criteria for reservation of the gaming terminal and subject to the eligibility criteria, causes the gaming machine to become reserved for a reserve period.

In one embodiment, when the reserve period expires on a said gaming machine, any credits on a credit meter of the gaming machine are automatically communicated by the gaming machine to the server system and associated with the identifier of the current player, and wherein the gaming machine only clears the credit meter and ends the reserve on the gaming machine after the server system has received the communication from the gaming machine.

In one embodiment, the plurality of gaming machines include a plurality of different classes of gaming machine and wherein the eligibility criteria include at least some player identifiers being eligible to reserve at least one said class of gaming machine but not eligible to reserve at least one other said class of gaming machine. In this embodiment, the plurality of different classes of gaming machine are classified according to at least one of the physical location of the gaming machine and the denomination of the gaming machine.

In one embodiment, at least one of the gaming machines is not eligible to be reserved by at least one class of player during a period of time. In this embodiment, the period of time may be preset by an operator of the gaming system. Alternatively, the period of time may be dynamically determined depending on a level of game play of the gaming machines.

In one embodiment, the gaming system determines the current player to be eligible to reserve the gaming machine dependent on a player history of the current player.

In one embodiment, the length of the reserve period is variable depending on at least one of the player identifier and data associated with the player identifier. In this embodiment, the data associated with the player identifier comprises tradeable units and wherein the system is operable to trade the tradeable units for reservation of a said gaming machine. Also, the system may be operable to trade the tradeable units in proportion to the time that the gaming machine remains reserved.

In one embodiment, the gaming system further includes a remote display, separate from the gaming machines and wherein the server system causes the remote display to display information indicative of the status of the reservation on one or more of the gaming machines.

According to a second aspect of the invention, there is provided a gaming system comprising a server system communicably connected to a plurality of gaming machines comprising a display and a user interface in communication with a game controller for providing a game in which a plurality of symbols are selected and displayed on the display, and if a winning combination occurs the game controller causes the award of an award, the player having wagered one or more credits held in a credit meter of the gaming machine to play the game, the gaming machines each further comprising player tracking means that receives an identifier from a current player of the gaming machine and a network communication interface to enable communication with the server system, wherein upon a certain operation of the user interface by the current player when the credit meter has credits on it, the gaming console is reserved by preventing play of the gaming console by any player other than a player with the same identifier for a predetermined period time, the credits on the gaming console are recorded by the server and associated with the current player and the credit meter is cleared, wherein if the predetermined period of time expires the reserve ceases and if a player with the same identifier returns to the gaming console during the predetermined period of time, the gaming console allows play of the game.

In one embodiment, if a player with the same identifier returns to the gaming console during the predetermined period of time, the credits recorded by the server are automatically added to the credit meter.

In one embodiment, the identifier comprises a player card and an associated personal identification number.

In one embodiment, the gaming system determines whether the identifier of the current player indicates that the current player is eligible to reserve the gaming console and the gaming console only becomes reserved following the predetermined action by the current player if the current player is determined to be eligible. In this embodiment, the gaming system may include a plurality of different classes of gaming console and wherein at least some player identifiers indicate that the player is eligible to reserve at least one said class of gaming console but not eligible to reserve at least one other said class of gaming console. Also, the plurality of different classes of gaming console may be classified according to at least one of the physical location of the gaming console and the denomination of the gaming console.

In one embodiment, at least one said gaming console is not eligible to be reserved by at least one class of player during a period of time. In this embodiment, the period of time may be preset by an operator of the gaming system. Alternatively, the period of time may be dynamically determined depending on a level of game play of the gaming consoles.

In one embodiment, the gaming system determines the current player to be eligible to reserve the gaming console dependent on a player history of the current player.

In one embodiment, the predetermined period of time is variable depending on at least one of the player identifier and data associated with the player identifier. In this embodiment, the data associated with the player identifier comprises tradeable units and wherein the system is operable to trade the tradeable units for reservation of a gaming console. Also, the system may be operable to trade the tradeable units in proportion to the time that the gaming console remains reserved.

According to a third aspect of the invention, there is provided a gaming machine comprising a display and a user interface in communication with a game controller for providing a game in which a plurality of symbols are selected and displayed on the display and if a winning combination of occurs the game controller causes the award of an award, the player having wagered one or more credits held in a credit meter of the gaming machine to play the game, the gaming console further comprising player tracking apparatus operable to receive an identifier from a current player of the console and a communication interface to enable transmission and reception of information with a remote communication device, wherein upon a predetermined action by the current player when the credit meter has credits on it, the gaming machine becomes reserved by preventing play of the gaming machine by any player other than a player with the same identifier for a predetermined period time, and wherein if the predetermined period of time expires, the gaming machine automatically transmits data onto the communication interface that specifies the amount on the credit meter, clears the credit meter and ceases the reserve and wherein the gaming machine awaits receipt of information on the communication interface that the data that specifies the amount on the credit meter has been received by a device remote from the gaming console before clearing the credit meter and ceasing the reserve.

According to a fourth aspect of the invention, there is provided a gaming machine comprising a display and a user interface in communication with a game controller for providing a game in which a plurality of playing elements are selected and a number of outcomes are defined within said plurality of playing elements, and when a winning combination of playing elements occurs in at least one of said outcomes the game controller causes the award of an award, the player having wagered one or more credits held in a credit meter to play the game, wherein the gaming machine is able to be reserved by a player by operating the user interface, wherein both the ability to reserve the gaming machine and the extent to which the console can be reserved is dependent on whether the current player of the gaming console is an eligible player.

According to a fifth aspect of the invention, there is provided a gaming machine comprising a display and a user interface in communication with a game controller for providing a game in which a plurality of playing elements are selected and a number of outcomes are defined within said plurality of playing elements, and when a winning combination of playing elements occurs in at least one of said outcomes the game controller causes the award of an award, the player having wagered one or more credits held in a credit meter to play the game, wherein the gaming machine is able to be reserved by a player by operating the user interface, wherein at least one the ability to reserve the gaming machine and the extent to which the console can be reserved is dependent on whether the current player of the gaming console is an eligible player and wherein whether the current player of the gaming console is an eligible player is determined by evaluating a measure of funds held by that player.

In one embodiment, the measure of funds held is determined solely with reference to the value of finds in the credit meter.

In one embodiment, the measure of funds is determined with reference to the number of credits in the credit meter.

In one embodiment, the measure of funds is determined with reference to the equivalent money value of the funds in the credit meter.

In one embodiment, the gaming machine further comprises player tracking apparatus operable to receive an identifier from a current player of the gaming machine and a communication interface to enable communication with a remote device, wherein the measure of funds held is determined with reference to the stored value of funds in a player account associated with the identifier. In this embodiment, wherein the measure of funds may be determined as the sum of the value of funds in the player account and a stored value of funds in the credit meter.

In one embodiment, a player is deemed to be a said current eligible player when the measure of finds exceeds a minimum threshold value.

In one embodiment, a player is deemed to be a said current eligible player when the measure of funds is between the minimum threshold value and a maximum threshold value.

According to a sixth aspect of the invention, there is provided a gaming system comprising a server communicably connected to a plurality of gaming consoles each comprising a display and a user interface in communication with a game controller for providing a game in which a plurality of playing elements are selected and a number of outcomes are defined within said plurality of playing elements, and when a winning combination of playing elements occurs in at least one of said outcomes the game controller causes the award of an award, the player having wagered one or more credits held in a credit meter to play the game, the gaming consoles each further comprising player tracking apparatus operable to receive an identifier from a current player of the console and a network communication interface to enable communication with the server, wherein at least one of the gaming consoles is able to be reserved so as to prevent play of that gaming console by any player other than a player with the same identifier, wherein at least one of the ability to reserve the gaming console and the extent to which the gaming console can be reserved is dependent on whether the current player of the gaming console is an eligible player and wherein the eligibility of the current player is determined by evaluating a measure of funds held by that player in a player account associated with the identifier received from the current player.

In one embodiment, eligibility of a current player is determined based on both the credits held in the credit meter and the funds held in the player account.

According to a seventh aspect of the invention, there is provided a gaming system comprising a server system communicably connected to a plurality of gaming machines, the gaming machines providing a game in which a player stakes a wager on the game and a plurality of symbols are selected and displayed on a display, and if a winning combination occurs during play of the game, the gaming machine awards an award, wherein the user interface of the gaming machines comprises means to receive an identifier from a current player of the gaming machine and the gaming machine communicates the identifier with the server system, wherein upon certain operation of the user interface by the current player the gaming machine becomes reserved for a reserve period and wherein when the reserve period expires, the server system causes a message to be sent to a portable device and wherein the gaming machine becomes unreserved in response to receipt of a certain signal from the portable device.

In one embodiment, when one of the gaming machines is reserved, the server system causes a display remote from the gaming machine to display a status of the reservation of the gaming machine, including indicating on the display when the reservation period has expired. In this embodiment, the display remote from the gaming machine may continue to display the status of the reservation of a gaming machine until the gaming machine becomes unreserved. Also, the display remote from the gaming machine may continue to display the status of the reservation of a gaming machine until the gaming machine becomes unreserved.

In one embodiment, the system includes a plurality of remote displays and individual displays selectively display the reserve status of different gaming machines. Also, a said remote display may display the reserve status of a gaming machine reserved by a player in response to receipt of a player identifier for that player at an interface associated with the remote display.

Further aspects of the present invention and further embodiments of the aspects described in the preceding paragraphs will become apparent from the following description, given by way of example, and with reference to the accompanying drawings.

Figure 1:
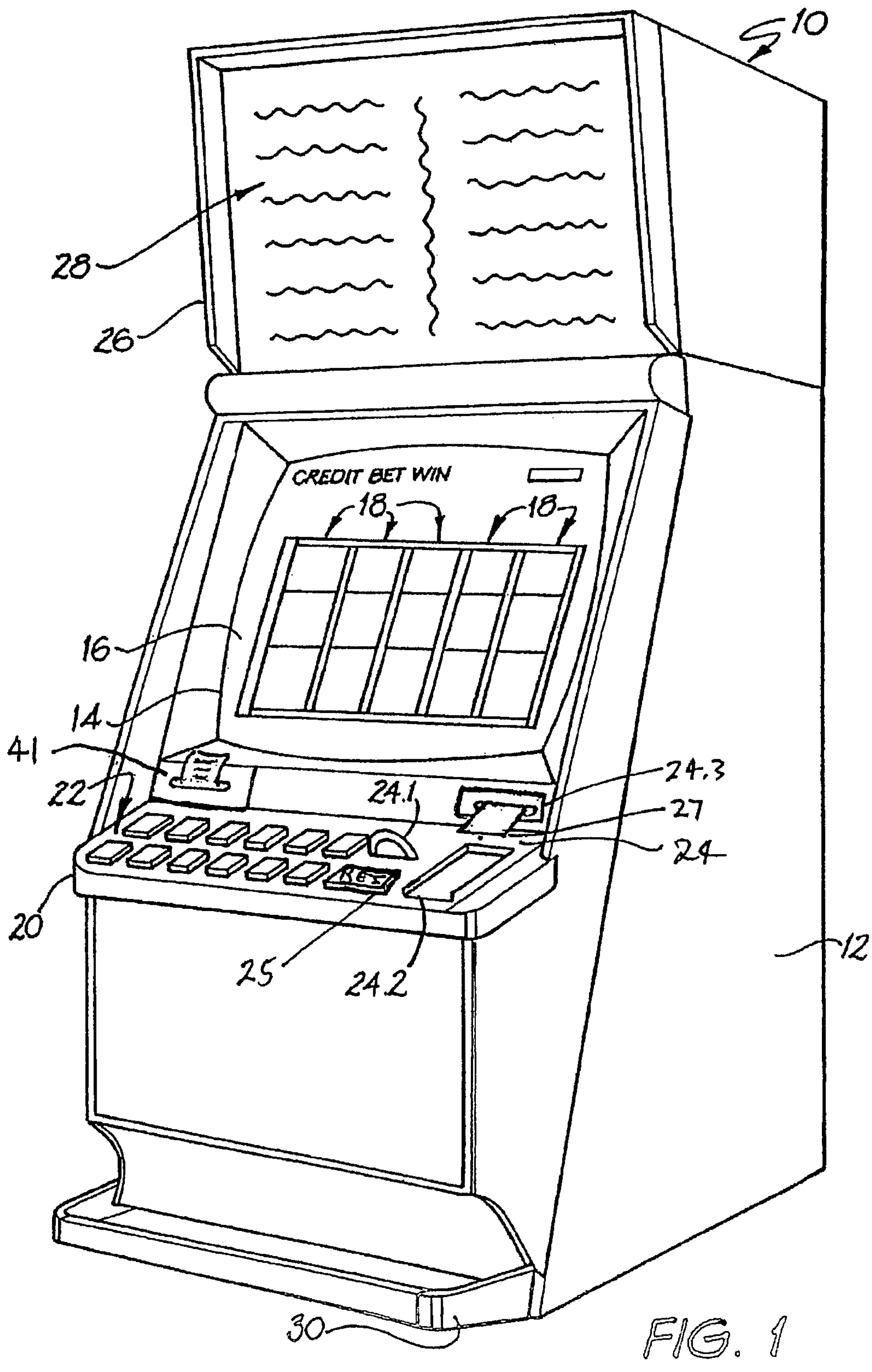
FIG. 1 shows a perspective view of a first style of gaming machine, suitable for use in systems implementing embodiments of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE PREFERRED EMBODIMENTS

Referring to FIG. 1 a typical gaming machine is illustrated of the type to which certain embodiments of the present invention can be applied. The machine illustrated in FIG. 1 is of a type that allows credit input by insertion of coins or bills, but the invention can also be applied to machines that only allow credit input by transfer of credit from a central cashier or from another gaming machine. In FIG. 1, reference numeral 10 generally designates the gaming machine, including a game or games to be played by a player of the machine. The machine 10 includes a console 12 having a display means in the form of a video display unit 14 on which a game 16 is played. The video display unit 14 may be implemented as a cathode ray screen device, a liquid crystal display, a plasma screen, or the like. The game 16 as illustrated in FIG. 1 is a spinning reel game which simulates the rotation of a number of spinning reels 18, however many other styles of game are also possible.

Figure 2:
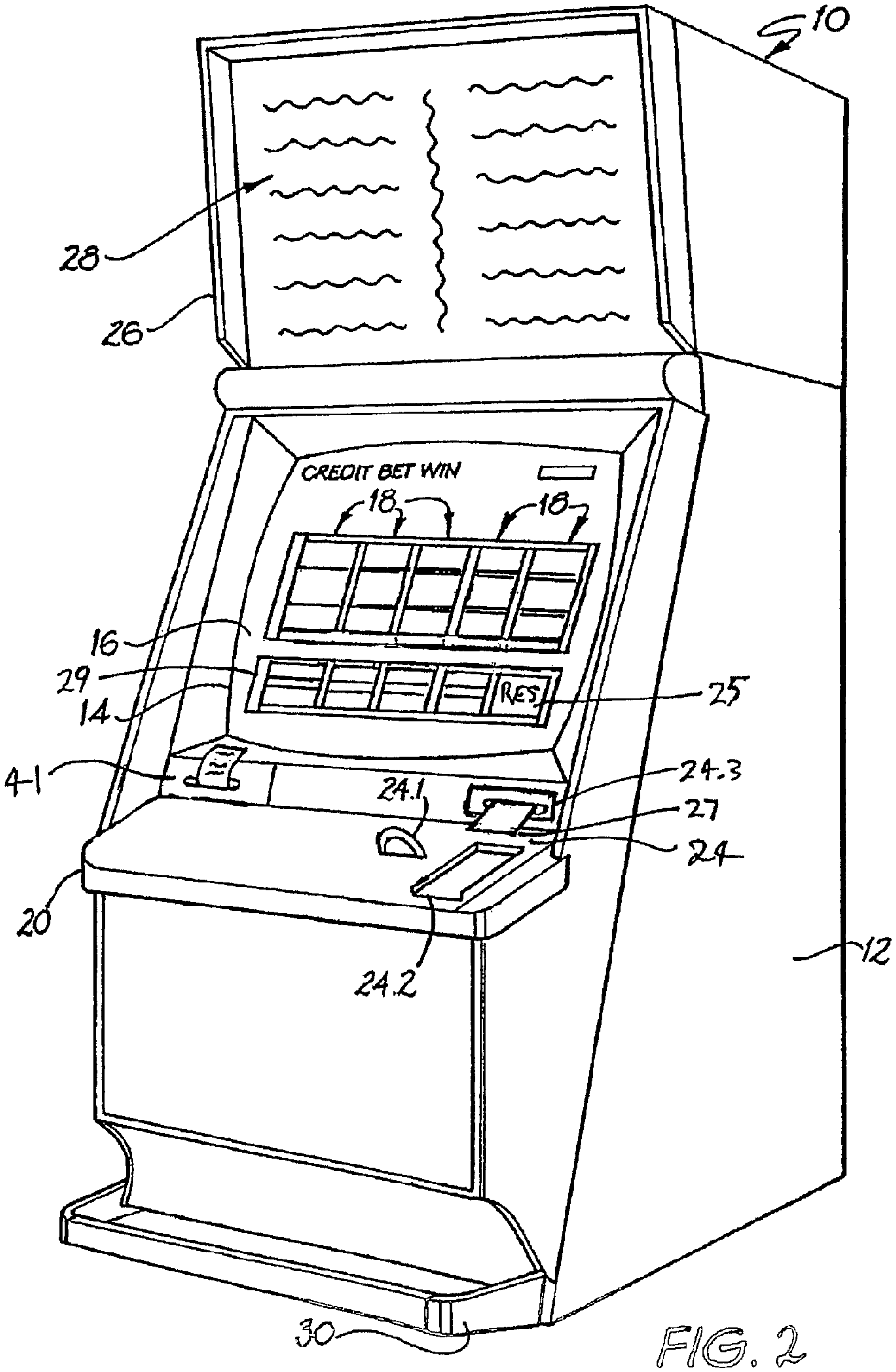
FIG. 2 shows a perspective view of a second style of gaming machine, suitable for use in systems implementing embodiments of the present invention.

A mid-trim 20 of the machine 10 optionally houses a keypad 22 for enabling a player to play the game 16. The mid-trim 20 also houses a credit input mechanism 24 including a coin input chute 24.1 and a bill collector 24.2. As illustrated in FIG. 2, some gaming machines use a touch screen for player input, in which case the keypad 22 would not be required on the mid-trim in those machines, but may still be provided if required for the particular implementation of the gaming machine 10. When a touch screen is used, one or more the keys of the keypad 22 of the FIG. 1 machine may be represented as a graphic image 29 on the screen 16 and touch sensors 38 (refer to FIG. 3) located adjacent the screen surface would detect touching of the screen to record player selections. In all other respects the machines of FIGS. 1 and 2 are essentially functionally identical.

The gaming machine 10 of FIGS. 1 and 2 includes a top box 26 on which artwork 28 is carried. The artwork 28 includes pay-tables, details of bonus awards, etc. A coin tray 30 is mounted beneath the console 12 for cash payouts from the machine I/O. In machines employing the present invention the machine is also connected via a computer network to other gaming machines and a system controller and credits can be applied to and cleared from the machine via the network. The credits can either be established at a cashiers station and transferred to the machine or alternatively a player might already have credits in another machine in the network and which they transfer to a new machine that they wish to play.

To facilitate the secure transfer of cash to a machine, each machine is provided with a card reader 24.3 and the player is issued with an identification card 27 either when entering the premises or when establishing credit in the system. This identification card 27 is inserted into the card reader 24.3 of a machine by the player after the player has established a credit on the system and has had the credit transferred to the desired machine. By inserting the card 27 into the card reader 24.3 of the machine he or she intends to play, the player identifies him or herself to the machine and establishes that the credit belongs to them. In the illustrated embodiment, the card reader 24.3 is not connected directly to the machine's controller 36 but to the system interface 51, which is connected to the network via interconnection 52 and to the machine controller 36 as seen in FIG. 3.

A reservation button 25 is provided as one of the buttons of the keypad 22 or of the pseudo-keypad 29 and is used in some circumstances to manually reserve the machine such as when the player wishes to go to the bathroom, or go to a designated smoking area. To reserve the machine the player would press the reservation button while their identification card 27 is still in the slot of the card reader 24.3. Then by removing the card, the machine would become locked preventing use of the machine by others until the original player's card is reinserted in the slot of the card reader 25.3, or until the reservation period times out as discussed below. In the event that the reservation period times out, in a process described in more detail herein below, the machine would transfer any credits held on the machine to a player account in a central controller and unlock the machine for play by another player. If the player decided to play another machine after having reserved the previous machine they were playing, they would simply insert their identification card into the new machine which would cause their credit on the previous machine to transfer to the new machine and unlock the previous machine. If, on the other hand, the reservation period had timed out on the previous machine and the player's credit had been transferred to the central controller, then the new machine would simply transfer the player's credit from the central controller to the new machine.

Figure 3:
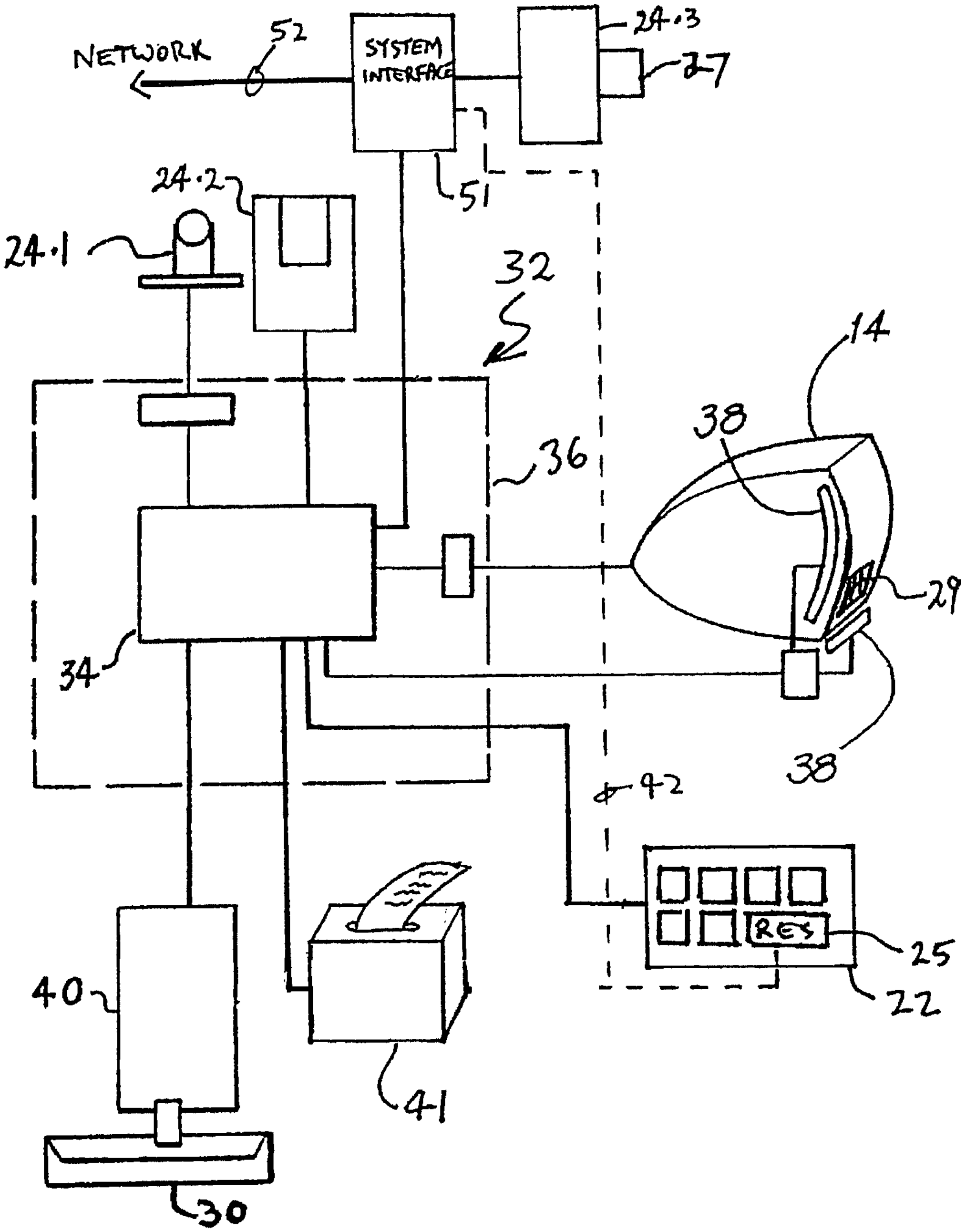
FIG. 3 shows a block diagram of a control circuit of the gaming machines of FIGS. 1 and 2.

Referring to FIG. 3 of the drawings, a control means or control circuit 32 is illustrated. A program which implements the game and user interface is run, for example, on a processor 34 of the control circuit 32. The processor 34 forms part of a controller 36 that drives the screen of the video display unit 14 and that receives input signals from player input devices such as the optional keypad 22 (see FIG. 1) or the optional sensors 38 associated with the pseudo-keypad 29 (see FIG. 2). The sensors 38, if used, include touch sensors mounted in the screen of the video display unit 14 and associated with the representation of pseudo- buttons of the keypad 29, displayed on the display 16, thereby replicating the buttons of the keypad 22. The controller 36 also receives input pulses from the mechanism 24 to determine whether or not a player has provided sufficient credit to commence playing. The credit input mechanism 24 may comprise one or more of several credit input devices such as a coin input chute 24.1 a bill collector 24.2, and a card reader 24.3 or any suitable other type of validation device. In some embodiments of the present invention it is important that there be a player tracking input device, such as the card reader 24.3, that can be used to associate a particular player with a particular credit held in the system (either as data held in a machine or in the system controller or possibly in a further controller reserved for financial information). Note that player identification does not require knowing the actual identity of the player but is only used to associate the player with a particular credit. This is achieved in the preferred embodiment by using a player tracking card 27, which is a simple magnetic stripe card encoded with a unique code, that may be issued to the player either when they enter the establishment or when they establish a credit in the system and is read by the card reader 24.3. However other methods of player identification can be employed such as pin numbers, scannable tags of various known types such as magnetic stripe cards, smart cards, etc. iris recognition, finger prints or other bio-sensor systems.

Finally, the controller 36 optionally drives a payout mechanism which, for example, may be ticket printer 41, or a coin hopper 40 for feeding coins to the coin tray to make a pay out to a player when the player wishes to redeem his or her credit.

Again however, in embodiments of the present invention, a payout mechanism is not essential, as the player may remove the credit held in the machine by transferring it to another machine or to a cashier. Where the player tracking card 27 is a smart card and credits are stored on the card, the payout mechanism may involve writing a new credit balance to the smart card.

Figure 4:
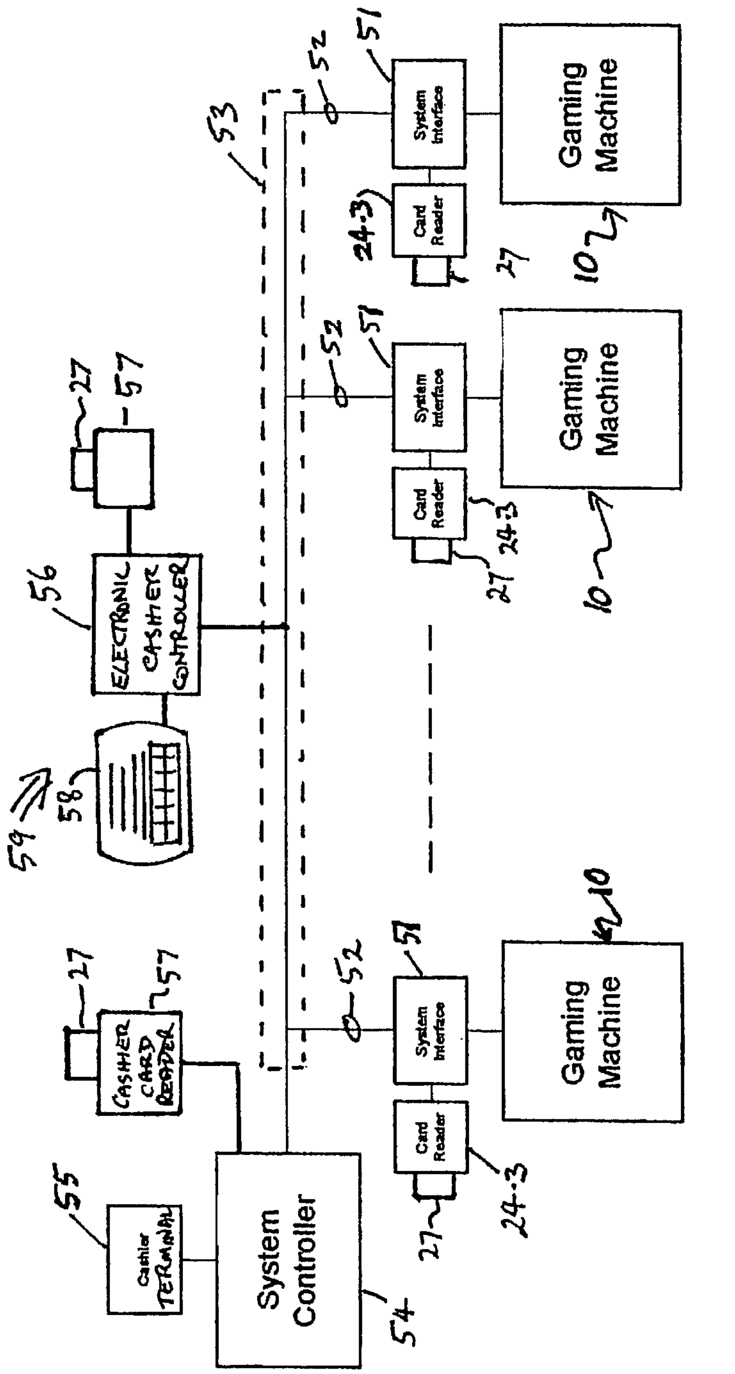
FIG. 4 shows a block diagram of a system implementing an embodiment of the present invention.

Referring to FIG. 4, a system in which certain embodiments of the present invention are implemented is illustrated. The system comprises a plurality of gaming machines 10 each connected to a network by its respective system interface 51 and network connection 52. The Network connections 52 are preferably connected to the remainder of the network via a hub 53, although other networking architectures such as daisy chaining may also be employed. Controlling the network is a system controller 54 and a cashier's terminal is optionally connected, either to the system controller 54 directly, as illustrated in FIG. 4, or alternatively via the network hub 53. As described in more detail below, the system controller 54 may be one or more server processes run on one or more server devices.

The Cashier may be replaced or supplemented by an electronic cashier or cash in/cash out terminal 59 comprising a controller 56 to which is connected a user touch screen 58 and a card reader 57. The electronic cashier uses EFT transactions to debit or credit a player's account at a financial institution to establish or refund a player's credit in the gaming system.

Figure 5A:
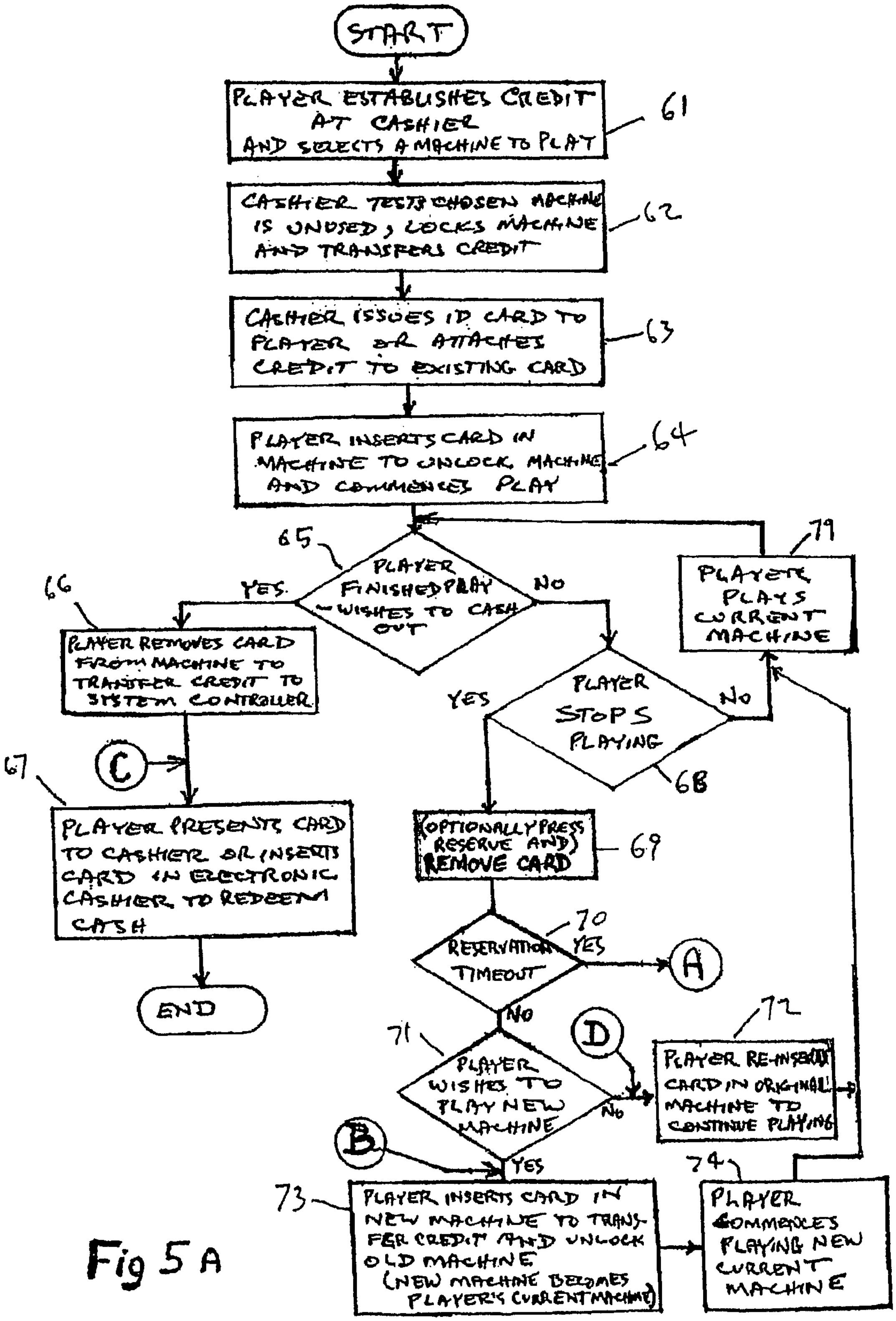
FIGS. 5*a* and 5*b* show a flow chart of the operation of a preferred implementation of the method of the invention.
Figure 5B:
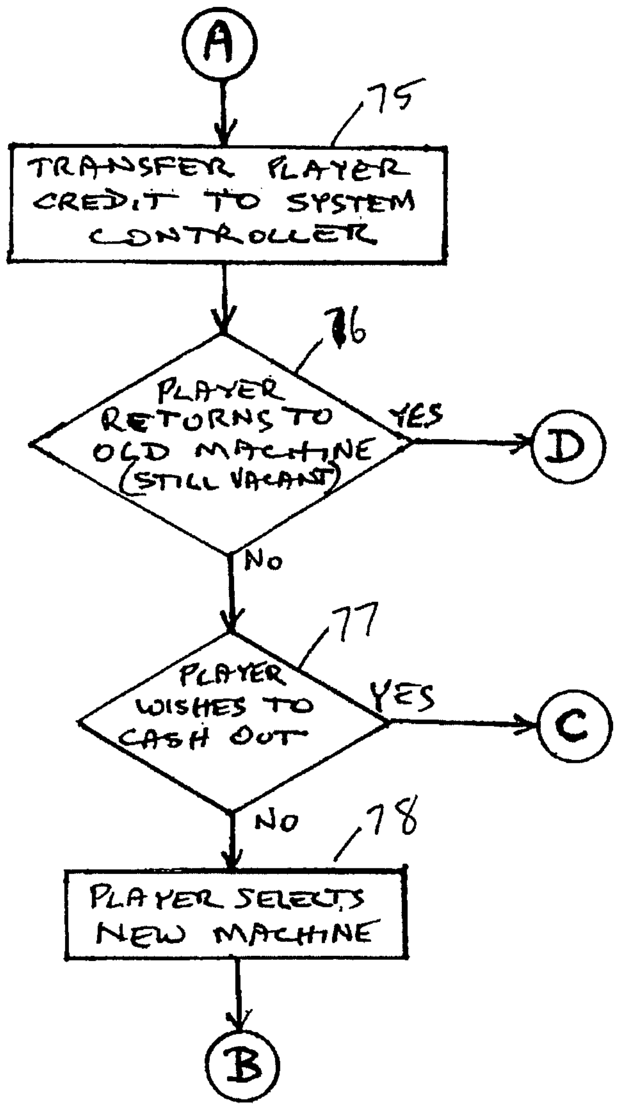

Referring to the flow chart of FIGS. 5A and 5B, the illustrated embodiment of the invention provides an improvement on the traditional line-of-sight system for establishing a credit on a gaming machine. As before, the player gives money to a cashier and selects a gaming machine to play (step 61). If the player's selected machine is not in use, credits are transferred to the gaming machine (step 62). However, when the credits are transferred to the gaming machine, it is automatically locked to prevent play. The player is given a unique key, which is used as a player tracking device and the key is associated with the credits transferred to the selected gaming machine (step 63). Preferably the key is a low cost magnetic card 27 encoded with a unique tracking number, and it is inserted into a compatible magnetic card reader 24.3 on the gaming machine to unlock the selected gaming machine. As explained previously herein other forms of identification may be used instead. For example, the identification material may include other types of cards such as smart cards, biometric data, and/or a personal identification number (PIN).

The player then proceeds to the selected gaming machine and inserts the card 27 to unlock the machine and proceed to play the machine (step 64). As no other player can unlock and hence play the locked gaming machine, line-of-sight visibility is no longer required. Further the cashier need no longer be a person, and could be an automated cash in/out, and card dispensing machine 59.

When the player has finished playing the gaming machine 10, and decides to "cash out" (step 65), they remove the card 27 (step 66) and return it to the cashier (step 67). When the card 27 is removed the gaming machine is again automatically locked, and secured against interference. The player presents 67 the card 27 to the cashier or inserts the card 27 into an electronic cashier 59 and the money remaining on the gaming machine is transferred back to the cashier and paid to the player by the cashier or is dispensed from the electronic cash in/out terminal, and the gaming machine is automatically unlocked for further play.

Once returned to the cashier the system may either allow the reuse of the card or prevent its further use. The card may be permanently destroyed by physical means, such as punching holes in the magnetic strip. The card may also be destroyed by logical means by recording its unique identification number in a database and not permitting its reuse. Further, cards may be enabled for use only for a preset time, for example within 24 hours of being issued, after which they are permanently disabled.

An unlocked machine with no credits cannot, of course, be played. In some implementations the gaming machines will have alternate means of inputting credits, such as a coin chute 24.1, a bank note acceptor 24.2, and can be played without an identification card. In the case where the gaming machine has no alternate credit input means it may not be necessary to unlock the machine when it has no credits, although this may in fact be done. One other reason to unlock the machine is that help and attract modes may only operate in the unlocked stated. Rather than change the design of current games to display help and attract when locked it may be preferable to simply unlock the machine, even if it cannot be played (because it has no credits).

Prior to the initial transfer of credits to the player's selected gaming machine the system detects if the gaming machine is currently in use (step 62) and if so, does not allow the transfer to proceed. The detection means determines that a player is currently using a machine if a valid card is inserted, there are credits on the machine, or buttons or the touch screen has recently been used. For example, the machine may have zero credits but a player is using the gaming machine's built-in help to examine the game. Further detection means, such as physical proximity detection, are possible.

In a further improvement, the player may decide to stop playing the machine either because they wish to move to another machine or because they wish to take a short break (step 68). In this case, they will remove their card 27 from the machine (step 69), which will cause it to lock while still retaining the player's credit. If the player chooses to play a new machine (step 71) they will move to the new machine and insert their card 27 (step 73).

The system detects the card 27 is in a different machine (and is no longer in the original machine), and automatically performs a cashless transfer of all the money from the original machine to the new one. Once complete, both machines are unlocked and the player commences playing the new machine (step 74).

In the event that, after the player has temporarily stopped playing 68 a machine and locked it by removing their card 27 in step 69, they return to the same machine and reinsert their card (step 72), they may continue playing that machine (step 79).

Therefore, when the player leaves a machine in step 68, the removal of the card 27 in step 69 leaves the machine locked until the player redeems the outstanding credits from a cashier in step 67 or it is transferred to another machine in step 73. However, it is also possible that they will leave the machine locked permanently if they do not redeem their credits. To prevent this happening the system implements a timeout mechanism (step 70). Preferably, the operator is automatically notified to take appropriate action, such as performing manual cash out on the machine, which results in the player's credit being held at the system controller (step 75) until claimed by the player in steps 77 and 67, or until the player tries to play with the same machine in steps 76 and 72, or a different machine in 78 and 73. A fall log of events is stored to enable tracking in case the player returns to play the machine further and a dispute arises with the casino operators. Alternately after the preset timeout period of a locked machine, step 75 involves the system automatically withdrawing credit from the machine and unlocking it for further play. In the event that the player returns to the old machine (step 76) and it is still vacant, they may reinsert their card 27 in the machine (step 72), which will cause the credit to transfer back to the machine after which the machine will allow the player to continue playing 79. Alternatively, the player may choose to select a new machine in step 78, in which case inserting their card 27 into the card reader of the new machine (step 73) will cause their credit to transfer to the new machine, which will unlock allowing the player to commence playing the new machine (step 74). The system may also detect multiple copies of the same card 27 in use, which would indicate either an error in the system or attempted fraud. The system takes appropriate action, such as locking the effected machines and/or setting off an alarm.

In some embodiments of this invention credits need not be stored at any time by the system, although it can be implemented to do so.

The storage and handling of money is a very sensitive issue, and it is preferable to limit it to those areas in which it is absolutely essential. Gaming machines already require and implement the means to store credits and are carefully tested and regulated to ensure they do so reliably.

In an alternate implementation the player gives money to the cashier (step 61) and it is stored on the system, and associated with the player's identification card 27 (step 63) until the player inserts their card 27 into a gaming machine (step 64). This has the advantage of simplicity from the player's point of view, but does require that credits be kept on the system until the player selects a machine.

It is an advantage of preferred embodiments of the system that the player need not be identified to use the system, although of course this may be done if desired. The means of doing this are well known and not described further.

Machine to Machine Credit Transfer Protocol

The system is designed such that a fault during the cashless transfer, such as a power failure or communication error, does not cause credit to be added or lost. Such techniques are well known, and one example, in which the system does not store player credit information, is described here by way of example.

When the magnetic stripe card is inserted into the new machine it is detected and a message sent to the system controller with the cards identification. The system determines that the card had been previously played on a different machine, and adds the exact same amount of credits to the new machine as exists on the previous machine.

At this point the player may start to play, but the previous machine still contains its credits unchanged, and remains locked. The system then removes the credits from the first machine and unlocks it.

The system logs each of these events and in the event of a failure can determine how to recover. Preferably a human readable log of events is simultaneously printed, identifying each cashless transaction. If a failure occurs before credits are transferred to the new machine, they still exist on the first machine and are not lost. If the failure occurs after the transfer to the new machine, the player cannot lose credits. Until the first machine is unlocked it cannot be played, so the operator will not lose any credits on that machine. The electronic or printed log may be used to understand the actual events and reconcile accounts.

Machine Reservation

Preferably the gaming machine 10 is automatically locked when the player's card 27 is removed, except when the credit on the machine is zero, in which case the machine remains unlocked. In one implementation the gaming machine 10 may have a reserve function button 25 to reserve the machine, by locking it even when the card is removed and credits are zero, provided the reservation button is operated before the card 27 is removed 68, or during a predetermined short period (for example, 5-10 seconds) after the card is removed. The machine may also refuse to register a new card during this period.

In one possible arrangement, the reservation button may be connected directly 42 to the system interface 51 of the gaming machine 10 (refer to FIG. 4).

Alternately, instead of the reservation button 25 being interfaced directly to the system interface device 51 it may be interfaced to the gaming machine as one of many keys on keypad 22 (as is common in practice). The gaming machine 10 will then read the button status and communicate it to the system interface device 51, and hence on to the system controller 51. Alternately the gaming machine reservation button 25 might be connected 42 to the system interface device 51 as well as to the gaming machine controller 36, such that the system and the machine may both sense the gaming machine reserve button status directly. The ability to reserve a machine with zero credit is particularly useful in implementations where players are issued cards prior to giving money to the cashier. In this implementation players may be given a card on entry to the gaming establishment with no credit associated with the card on the system or any machine. The player may use the card to transfer money to a machine by using the cashier. Alternately the player can use the reservation button on the machine to lock a machine (with no credits), and then using the cashier transfer credits to that machine. The system automatically detects the reserved machine and transfers credit to it, or if the player chooses, to a different machine (in which case the first reserved machine is automatically unlocked).

Figure 6:
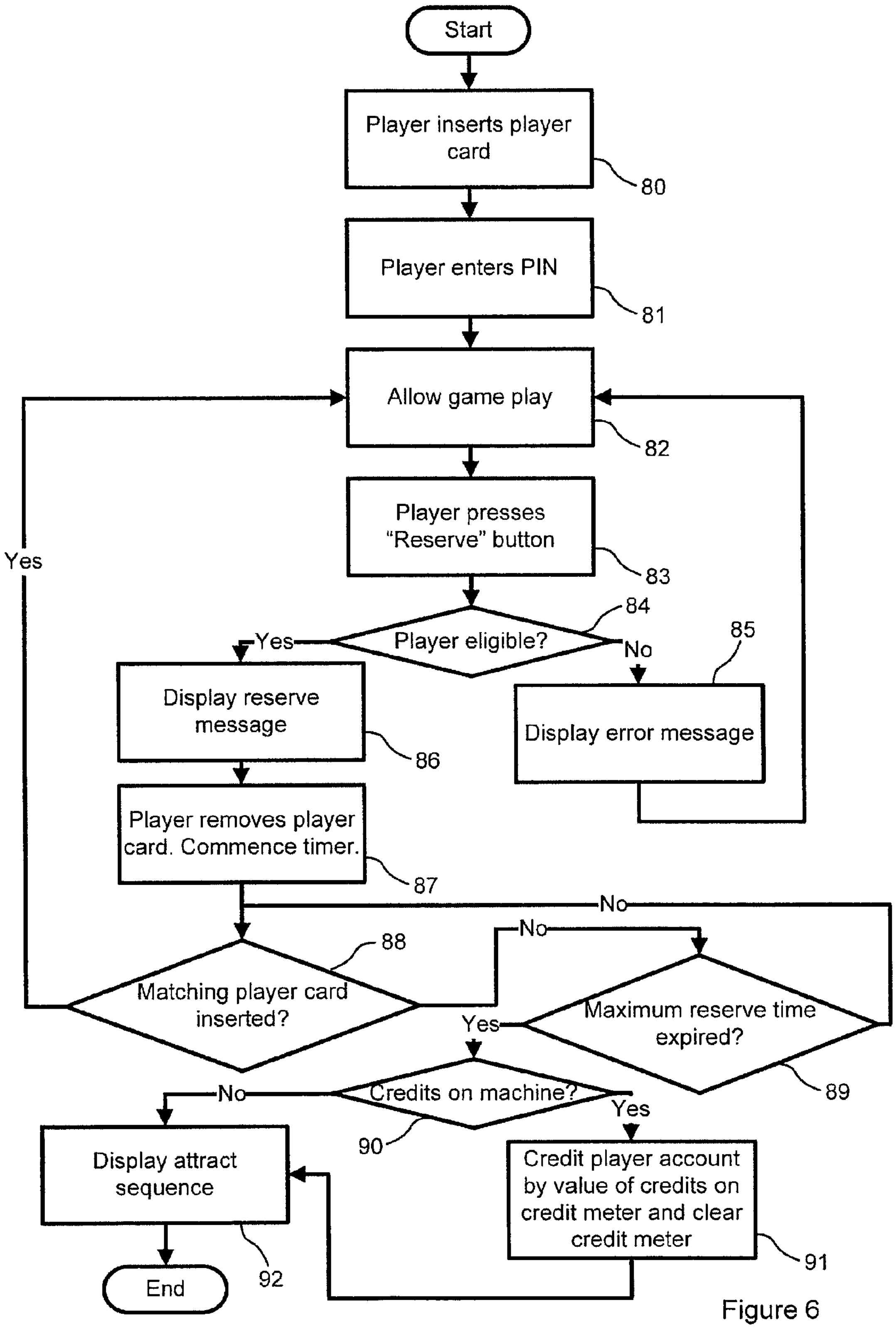
FIG. 6 shows a flow chart of the operation of a further preferred implementation of the method of the invention.

FIG. 6 shows a flow chart of a process which may be performed by the system of FIG. 4 in accordance with another embodiment of the invention. The process is implemented when a player wishes to reserve a game machine and steps that would be performed by the gaming machine 10 or network that are not directly associated with the reservation function have been omitted from FIG. 6 for clarity of illustration. The description of FIG. 6 refers to the gaming machine 10 communicating with the network, which is intended to include the system interface 51 or another device associated with the gaming machine controller 36 transmitting information onto and receiving information from the network, whether under the control of the gaming machine controller 36 or not.

In step 80, a player inserts a player card 27 into a gaming machine 10. In one embodiment, the player card 27 contains details that identifies a player account that contains credits or funds that may be converted into credits. The gaming machine 10 uses its card reader 24.3 to read the card 27 and then may request, suitably by displaying a message on its display 14, the entry of a personal identification number (PIN). The player enters their PIN (step 81) and the gaming machine causes the PIN to be verified by comparing it with a pre-stored PIN associated with the player card 27. The pre-stored PIN may be stored on the card 27, or stored by the system, for example in a database of personal identification numbers and associated card numbers.

If the player enters the correct PIN, they are allowed to play the gaming machine 10 (step 82) as the player identified by the player card 27. The player may then use a user interface, for example the touch screen 29 of the gaming machine 10 to transfer credits to the gaming machine 10 from their player account if the credits were not automatically transferred, and commence play of the gaming machine 10.

Some time after commencing play, the player presses the "Reserve" button 25. In this embodiment only certain players are permitted to reserve a gaming machine 10. Therefore, after the player presses the "Reserve" button 25, or performs some other step indicating that they may wish to reserve the gaming machine, such as removing their player card while credits are still on the credits meter, the gaming machine 10 then checks the player's eligibility to reserve gaming machines 10 or causes the player's eligibility to be checked (step 84). The eligibility of a player to reserve gaming machines may be indicated by data on the player card 27, or by the system, for example in a database in communication with the system controller 54 (which may be the same database as that which contains the PIN numbers described previously herein), containing a list of player identification numbers matching the numbers on the player cards, and a flag indicating whether they are eligible to reserve gaming machines 10.

If the player is not eligible to reserve gaming machines 10, then an error message may be displayed on the display 14 of the gaming machine 10 where the player is located, informing them that the reserve function is not available and optionally informing the player how to become a player that is eligible to reserve a gaming machine 10 or why the reservation function is not available. The process then returns to step 82, allowing the player to continue to play the gaming or cash out and quit playing. If the player has simply removed their player card without pressing a reserve button and there are credits on the machine, the system may automatically reserve the machine if the player is eligible, and if not, automatically transfer credits on the machine to the player's account if the player is not eligible to reserve the machine.

If the player is eligible to reserve gaming machines 10, then in step 86 the gaming machine 10 that the player was playing locks and displays a "Reserved" message, either on the display 14, on a display 51A (see FIG. 3) associated with the system interface 51, on both, and/or elsewhere. If the player has not already done so, they then remove their player card in step 87, which commences a timer. Optionally, the card may be automatically ejected from the card reader 24.3 and visual and/or audible alerts may prompt the player to take their card 27. For example a beeping may sound and a bezel (not shown)

around the slot of the card reader 24.3 may flash and/or a prompt may be displayed on one or both the displays 14 and 51A.

While the gaming machine 10 is reserved, it monitors for the re-insertion of the player card of the player who reserved the gaming machine 10 (step 88). If a machine player card 27 has been reinserted, the process returns to step 82 and the player is allowed to continue to play the gaming machine 10. As described previously herein, the gaming system may also monitor for re-insertion of the player card at another gaming machine 10, in which case the credits may be transferred to the new machine, or back to the player's central account and the reserved machine unlocked. If a matching player card 27 has not been reinserted, the gaming machine 10 checks in step 89 whether the maximum reserve period has expired by checking the value of the timer started in step 87. If the maximum reserve period has not expired, then steps 88 and 89 are repeated.

If the maximum reserve time has expired, then the process proceeds to step 90, in which case the gaming machine 10 checks if there are any credits on its credit meter. If so, the credits are transferred to the player's account, identified by the player identification number stored on the player card and read by the gaming machine 10 when the player first inserted their card, and the credit meter is cleared to zero (step 91), and the process then proceeds to step 92. Step 91 may be achieved by the gaming machine 10 sending data addressed to the system controller 54 or other server or device connected to the network, which is adapted to maintain a record of player identifiers and credit balances.

If there were not credits on the machine, the process may proceed from step 90 directly to step 92. In step 92 the gaming machine 10 is unlocked and may display an attract sequence to advertise the availability of the gaming machine 10 to be played and attract players to that gaming machine 10.

In another embodiment of the present invention, step 91 may be automatically performed following the reservation of a gaming machine 10, for example following step 87. In this embodiment the credits may be transferred back to the gaming machine 10 if it is determined in step 88 that a matching player card has been reinserted, prior to allowing game play to continue in step 82.

In the preferred embodiment of the present invention, the gaming machine 10 awaits confirmation of receipt of the information that it sent notifying of the value on the credit meter before clearing the credit meter in step 91.

Although the example of a preferred embodiment of the invention described in relation to FIG. 6 assumes that each player has a central player account, in alternative embodiments of the invention, the central player account may be omitted. In this case, the player may still use a player card, PIN and/or other information to identify themselves. However, the player carries their funds with them, for example on the player card, or by inserting money or money's worth into a credit mechanism 24. In this embodiment, if the player reserves a gaming machine 10, and the maximum reserve period expires, the number of credits, if any, still on the gaming machine, or a value indicating the money's worth of the credits, are stored in a database associated with the player identification information. When the player returns to a cashier's station they may be notified of their credits and paid the funds.

The eligibility of player to reserve gaming machines 10 may be qualified in a number of ways. For example, instead of having a binomial "yes", or "no" eligibility that applies for all gaming machines 10 in any location, at any time, the eligibility may be qualified by any or all of the following:

a) The player is eligible to reserve only certain gaming machines, or a certain type of gaming machine. For example, the player may only be allowed to reserve gaming machines in a certain area at a gaming venue, only allowed to reserve gaming machines that play a certain denomination or range of denominations, or only allowed to reserve gaming machines at a particular gaming venue where the gaming system is in communication with or controls multiple venues. In another example, only certain players may be eligible to reserve a gaming machine with zero credits on the meter.

b) The player is eligible to reserve gaming machines only during certain periods. The periods may be fixed, for example between 10 am and 3 pm, or may be variable, for example as set by a casino administrator, or dynamically determined depending on demand for gaming machines at the time.

c) There may be varying classes of eligibility. For example, some classes of player may be able to reserve a gaming machine for up to 5 minutes, while others may be able to reserve the same gaming machine for up to 10 minutes. The classification of the player may also determine what gaming machines they can reserve and during what periods they can reserve the gaming machine. The classification of the person may be determined using any method, for example by indicating whether they are a member of a loyalty program provided by the gaming venue, based on the player's past gaming history, or otherwise. Information indicating the player's status may be stored centrally in the gaming system or alternatively stored on a player card or other player identification device readable by a gaming machine 10, for example a magnetic swipe card or a smart card.

d) The number of times that a player can reserve a gaming machine in any given period may be limited. For example, a player may be eligible to perform a reservation of a gaming machine up to five times in any 24 hour period. Again the classification of the player may also influence the number of reserves allowed to be made in any given period of time. A player may be able to earn "reserve credits" through play on the gaming machines at a casino and/or otherwise. The "reserve credits", once earned can be redeemed each time a machine is reserved, for example taking a fixed amount for each reserve, or taking a variable amount depending on characteristics of the reserve, including the duration of the reserve, the day, or time of day, or what the current demand is for gaming machines at the venue.

e) The eligibility of a player to reserve machines may be determined based on the funds held in the credit meter of the gaming machine or machines that they are currently playing and/or based on the funds held in a player account associated with their player identifier.

For option d), the reserve credits may be able to be traded for reserve time on a gaming machine, so that an eligible player is one with a positive balance of reserve credits, or reserve credits above a threshold value. For example, each minute of reservation may require five reserve credits. In this embodiment the maximum reserve time may be dictated solely by the reserve credits, or the maximum time may be otherwise determined. Alternatively, a reserve may be initiated with a maximum reserve period of five minutes by trading in ten reserve credits. The number of reserve credits required and the rate of accumulation of reserve credits may be configurable.

In a still further alternative for option d), a player may need to play at a gaming venue or at any one of a number of gaming venues a certain amount and once that threshold is achieved, they may be given the ability to reserve gaming machines for a bonus period, for example one month. Optionally, the player may have to reach the threshold within a certain time limit, for example over a single month.

For option e), the values that result in eligibility may be configurable to provide control over which players are eligible. For example, the venue operator could set a minimum credit value of $500 in the player account and/or in the credit meter for the player to be eligible to reserve a gaming machine. The gaming machine or gaming system may also allow the venue operator to set a maximum value. For example the player account and/or credit meter may need to have a value of $2000 or less before the player is eligible to reserve a gaming machine. The thresholds could be compared with the amount in the credit meter alone, the amount in the player account alone, or compared with a combination of the values in the credit meter and the player account, for example by adding the values together.

The value in the credit meter may be converted to an actual dollar value and then compared to the eligibility criteria. Using this method, players playing a relatively high denomination machine only have to have the same equivalent dollar amount in the credit meter as players on a relatively low denomination machine. However, in another embodiment the determination of eligibility may be made with reference to the number of credits on a credit meter without reference to the equivalent dollar amount, in which case the higher the denomination of the machine, the more funds required before the player becomes eligible to reserve the machine.

Different amounts of funds may result in the player being eligible for different levels of reservation. For example, a player with between $500 and $1000 may be eligible to reserve some machines but not others and a player with between $1000 and $2000 may also be able to reserve some or all of the other machines. Other eligibility criteria may be varied dependent on the funds in the credit meter and/or in the player's account, including for example the maximum duration of a reservation and/or the times during the day when a machine may be reserved. Increased ability to reserve gaming machines may be provided to players with higher amounts in the credit meter or player account. However, it is also possible to reduce the ability of players to reserve machines should the value exceed a certain amount.

In one embodiment, the duration that a machine can be reserved may be related to factors other than individual player eligibility, which may be used instead of or in addition to the player eligibility criteria. For example, during times when the gaming venue operator expects there to be high demand for gaming machines 10, the maximum duration of reservation may be increased and/or any cost of reservation, in "reservation credits", normal credits or otherwise may be increased. The maximum duration of reservation and/or cost of reservation may vary intra-daily, daily, weekly, monthly and/or yearly and may also be manually adjustable by the gaming venue operator. The determination of the maximum duration or cost of reservation may be made automatically.

The system controller 54 may track indicators of demand, including for example how many machines are currently being played, how many machines are currently reserved and an entrance machine or a cash in/cash out terminal 59. Using these inputs, the system controller 54 may vary the maximum duration and/or cost of reservation. For example, the system controller 54 may be able to select between three levels of reservation: 7 minutes, 12 minutes, 20 minutes and two levels of cost: 1 credit per minute or 2 credits per minute. With between 0-30% of machines in play, player may be able to reserve their machines for up to 20 minutes. With between 30-60% of machines in play, players may be able to reserve machines for 12 minutes at a cost of 1 credit per minute. With between 60-80% of machines in play the maximum duration may decrease to 7 minutes. If over 80% of the machines are in play the cost may increase to 2 credits per minute and the system controller 54 may limit the ability to reserve machines to a certain number. The system controller 54 may implement a waiting list for reservations in implementations where the number of reservation is limited. Limits on the number of machines that can be simultaneously reserved may be implemented for all time and the limit may be fixed, or variable dependent on time/day, or on one or more measures of demand.

The system may monitor the number of machines that are currently reserved and if the number exceeds a certain value, for example 10%, then the duration of reservation for new reservations may be reduced and/or the cost of reservation increased. Variation of the maximum time or cost of reservation may also depend on how many people are at the gaming venue as determined from operation of the cash in/cash out terminal 59 or an entrance machine, relative to how many machines are being played and reserved.

In addition, control over the ability to reserve machines, duration for which machines may be reserved and cost of reservation may vary for different types of machines. For example, if a new bank of gaming machines has been introduced, the gaming venue operator may deactivate the ability to reserve any of the machines for the first few months that they have been released. Also, demand may be measured for types of gaming machines, instead of for all gaming machines at a venue. For example, if there are ten gaming machines that play a certain game, the system controller 54 may vary the reserve parameters for those ten gaming machines dependent on how many are currently being played. The type of gaming machine that is monitored may be specified by the particular game, by the game denomination so that different games of the same denomination are grouped for the purposes of controlling the reservation function, or otherwise.

The determination of eligibility may be made by the control circuit 32, by the system controller 54, or by another device in the gaming system.

Figure 7:
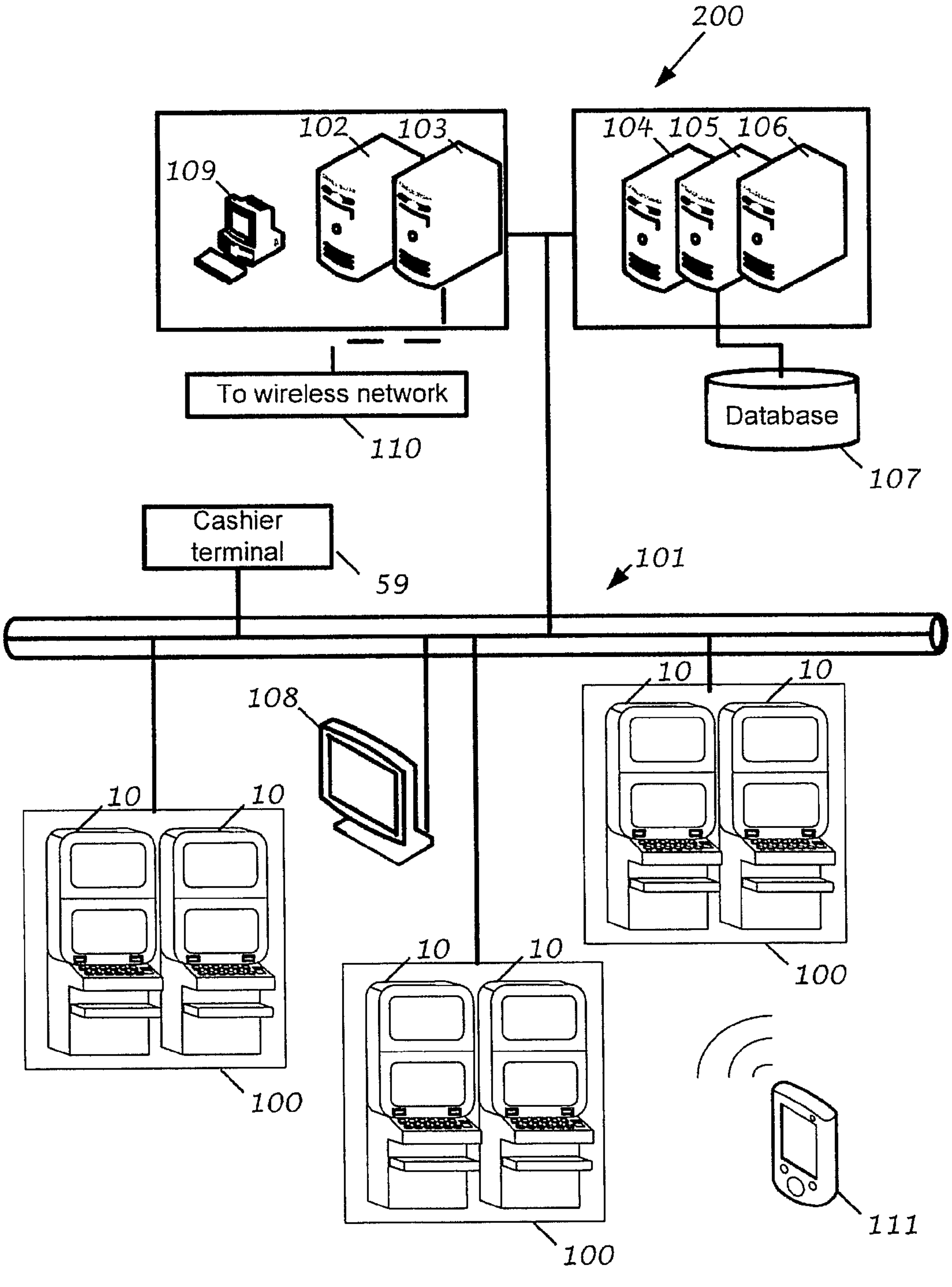
FIG. 7 shows a diagrammatic representation of another system implementing an embodiment of the invention.

FIG. 7 shows an alternative gaming system 200 to the gaming system shown in FIG. 4, in which embodiments of the present invention may be implemented. The gaming system 200 includes a plurality of gaming machines 10, in this embodiment arranged in three banks 100 of gaming machines, each bank 100 consisting of two gaming machines 10. The gaming machines 10 communicate via a bank controller (not shown) with a network infrastructure 101, which may be in the form of an Ethernet, but may be any suitable proprietary or non-proprietary fixed line or wireless network.

The gaming system 200 may include one or more displays 108 that may be controlled by a network device. The displays 108 may be plasma screens and if provided will typically be large screens able to be viewed from a particular area of the gaming venue by a number of people.

A collection of servers 102-106 provide various functions for the gaming system 200. The servers 102-103 be distinct physical devices, or may be server processes run on one or more physical devices. One or more databases 107 may provide electronic data storage for the gaming system 200. The database 107 may store player account information, the storage and retrieval of which may be managed by the server 105. An administrator terminal 109 may be provided to allow a gaming venue operator to configure aspects of the gaming system 200, run reports and perform other gaming floor management and administration activities.

The server 103 may act as a gateway to a wireless network 110, which may allow the server 103 to send messages to a portable device, for example the personal digital assistant (PDA) 111. Two way communication between the server 103 and the PDA 111 may also be provided. If the network infrastructure 101 is a wireless network, then a second wireless network may be unnecessary.

An electronic cashier or cash in/cash out terminal 59 is provided in communication with the network infrastructure 201, which may be used to perform the same functions as the terminal described in relation to FIG. 4.

In this embodiment, the operations of the system controller 54 are performed by the servers 103 and 105. The server 105 may manage the player accounts of players in the database 107. Suitable database management servers and processes are known in the art and will not be described further herein. The server 103 may manage the reservation of the gaming machines 10.

Figure 8:
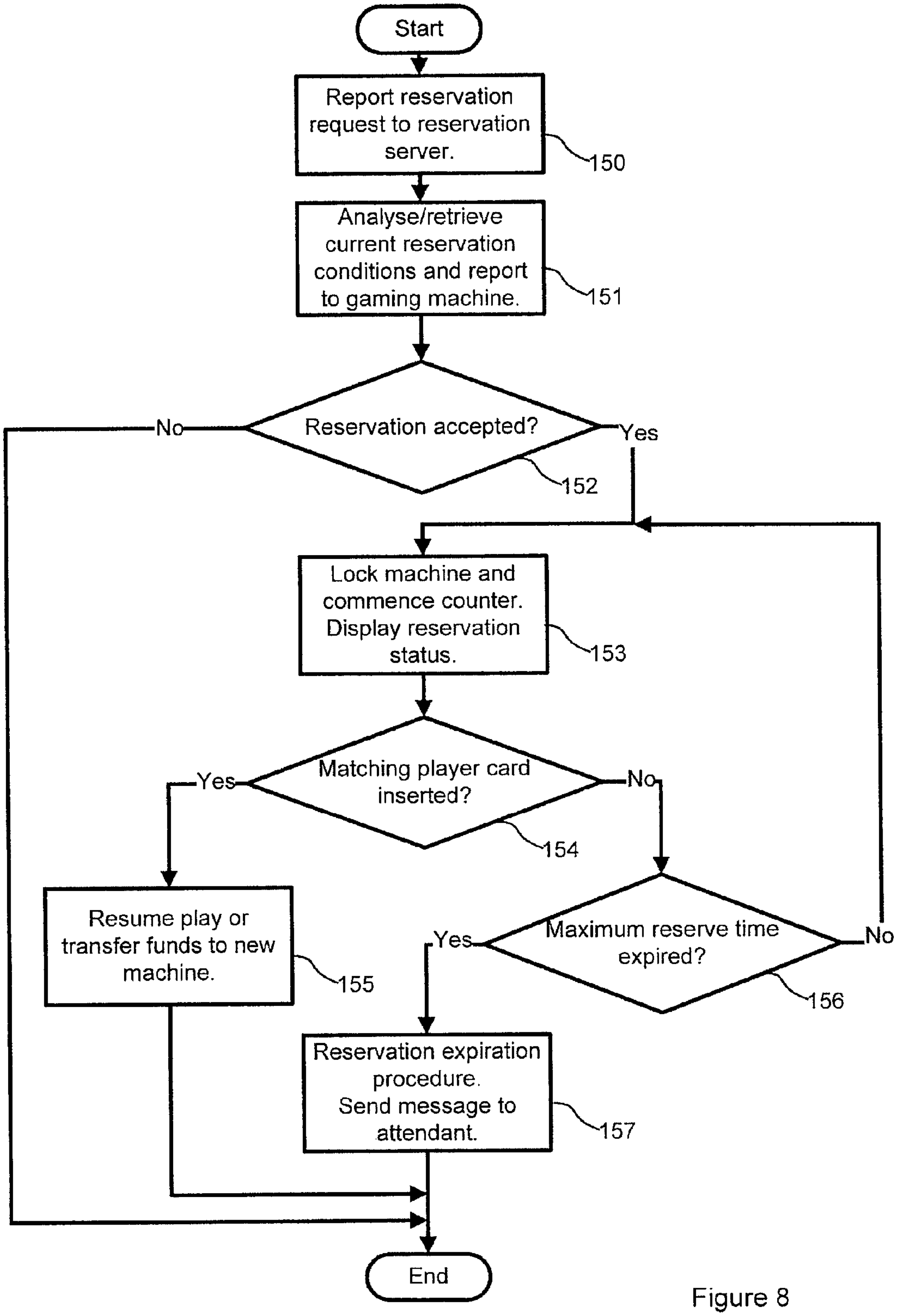
FIG. 8 shows a flow diagram of a process performed by a gaming system in accordance with an embodiment of the invention.

The gaming system 200 may implement the method described herein in relation to FIG. 6, including transferring credits between different gaming machines. The gaming system 200 may also perform the method described in relation to FIGS. 5A and 5B. In addition, the gaming system may perform the process shown in FIG. 8. This process may form supplementary steps following step 84 to the process described herein in relation to FIG. 6 and this implementation is assumed for the remainder of the description of the process shown in FIG. 8.

At step 150, the player has either pushed a "Reserve" button, or removed their player tracking card while the credit meter of the gaming machine 10 still has credits on it. In response, the gaming machine 10 reports the request for reservation to the server 103. At step 151, the server 103 receives the request and reports back to the gaming machine 10 the reservation period and/or cost. In one implementation, the server 103 may look up a table that lists periods throughout the day and the reservation time allowed during those times and reports this back to the player of the gaming machine 10. The gaming machine 10 then displays on the display a message indicating the reservation time and may also ask for confirmation that the player wishes to proceed.

Confirmation of the reservation may be important in embodiments where there is a cost associated with reservation and even more so where the maximum reservation time and/or cost per minute of reservation time purchased is variable. In other embodiments, receipt of confirmation may be less important and may be omitted from the process.

The gaming machine 10 monitors its user interface, for example the touch sensors 38, for confirmation of the reservation (step 154). If the reservation offer is not accepted, the process ends and the player has the choice to either continue playing, or cash out from the gaming machine.

If the reservation is accepted, the process continues to step 153, in which case the gaming machine 10 is locked and displays a reserve message. A reservation counter is also commenced. The server 103 associates the counter with an identifier of the player who reserved the machine. This identifier may be an identifier read from the player tracking card in step 80 of the process described in relation to FIG. 6.

Figure 9:
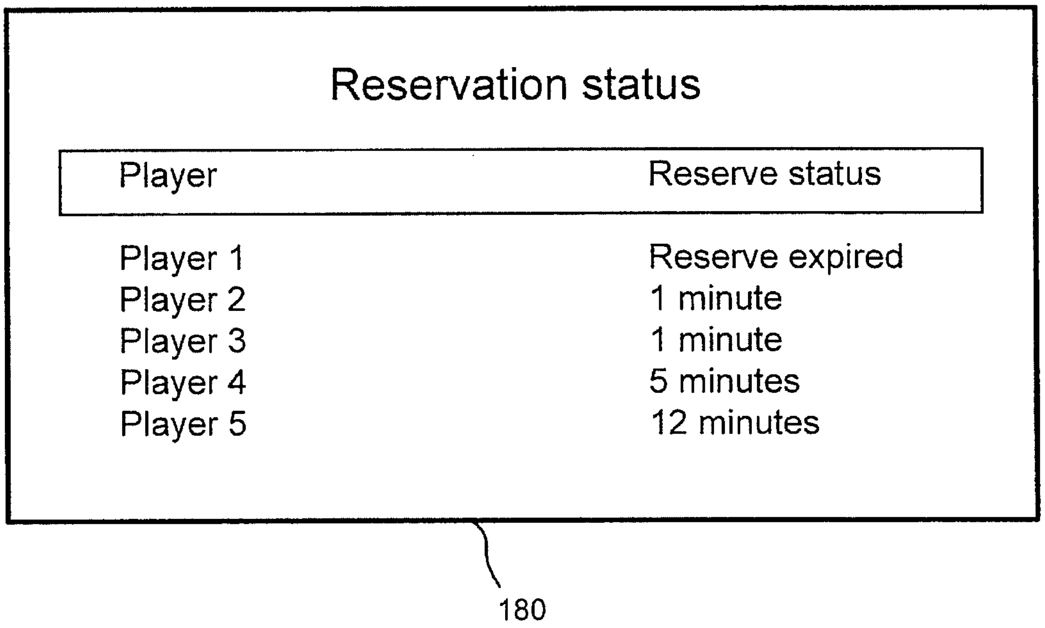
FIG. 9 shows a screen display that may be displayed on a display of the system shown in FIG. 7 in accordance with one part of the process shown in FIG. 8.

The server 103 may also control the display 108 to display the reservation status of reserved gaming machines. A very schematic representation of a possible screen display 180 is shown in FIG. 9. The screen display 180 includes a heading "Reservation status" and a list of players and the status of their reservation. Player 1 is shown as having a reservation expired. This means that either the gaming machine 10 has been unlocked, and is available for others to play, or is about to be unlocked. The server 103 may for example, cause the display 108 to display this for two minutes after the reservation timer reaches the maximum reservation time. Players 2-5 each have between 1 and 12 minutes reservation time remaining.

The server 103 may display information for all currently reserved gaming machines 10 on the display 108. If there are too many to fit on a single screen, then the information may scroll. In one embodiment, the server 103 may only display the status for machines within a certain time from the maximum reservation time, for example within ten minutes of reservation expiration. A large display 108, for example a plasma screen may for example be located at a designated outdoor smoking area. Displays at other locations may also be provided.

The status of Player 1 may continue to be displayed until the gaming machine actually becomes unlocked. The gaming system may allow a grace period of fixed or variable duration after the expiration of the reserve period. In the embodiment where an attendant unlocks the gaming machine, the reserve status may continue to be displayed until the gaming machine is actually unlocked.

Certain displays may selectively display the status of certain gaming machines 10. For example, at a large venue, each display 108 may display the status of gaming machines 10 on the same floor. In another embodiment, players may insert their player tracking card into a reader at a location, or otherwise provide the identifier used to reserve the gaming machine 10 and in response the server 103 may cause a display at that location to display the reservation status for that player.

The process then cycles around steps 153, 154 and 156 until the player returns to the gaming machine 10, starts play at another gaming machine 10, cashes out at a cashier terminal 59, or the reservation time expires. Steps 154 and 156 are similar to steps 88 and 89 described in relation to FIG. 6.

If the player returns to the gaming machine 10, starts play at another gaming machine 10, cashes out at a cashier terminal 59, then the process proceeds to step 155 and play at the gaming machine 10 is resumed, or funds are transferred to the new gaming machine 10 or to the cashier terminal 59 as required and the reserved gaming machine 10 is then unlocked. If the reservation time expires, then the process proceeds to step 157 and a reservation expiration process is completed. This may involve 90-92 described previously relation to FIG. 6. The gaming machine 10 may then automatically unlock. Alternatively, the server 103 may send a message to an attendant to unlock the gaming machine 10. This message may be sent to the PDA 111. The attendant may then use the PDA 111 to unlock the gaming machine 10. The attendant may also use the PDA 111 to lock a gaming machine 10.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

Throughout the specification the term "comprise" and variations on this term including "comprising" and "comprises" are to be understood to imply the inclusion of a feature, integer, step or element, and not to exclude other features, integers, steps or elements.

The invention claimed is:

1. A gaming system comprising a server system communicably connected to a plurality of gaming machines, the gaming machines providing a game in which a player stakes a wager on the game and a plurality of symbols are selected and displayed on a display, and if a winning combination occurs during play of the game, the gaming machine awards an award, wherein at least one of said plurality of gaming machines comprises a user interface which includes apparatus to receive an identifier from a current player of the gaming machine and the gaming machine communicates with the server system to provide access to a player account associated with the identifier and maintained by the server system, wherein upon operation of the user interface by the current player, the server system determines eligibility criteria for reservation of the gaming machine, and subject to the eligibility criteria, the server system causes the gaming machine to no longer operate to play a game for a period of time, the eligibility criteria defining a variable characteristic of the gaming machine or of the player and including one or more of the following: (a) the type of gaming machine requested for reservation; (b) the location of the gaming machine requested for reservation; (c) the time period for the requested reservation; (d) the class of the player; (e) the class of the gaming machine; (f) the number of requests for reservation of gaming machine(s) by the player during a specified time period; and/or (g) the amount of funds held by the player in a player account associated with the identifier received from the current player.

2. The gaming system of claim 1, wherein the plurality of gaming machines include a plurality of different classes of reservable gaming machines and wherein the eligibility criteria include at least some player identifiers being eligible to reserve at least one said class of reservable gaming machine but not eligible to reserve at least one other said class of reservable gaming machine.

3. The gaming system of claim 2, wherein the plurality of different classes of reservable gaming machines are classified according to the physical location of the gaming machines.

4. The gaming system of claim 2, wherein the plurality of different classes of reservable gaming machines are classified according to the denomination of the gaming machine.

5. The gaming system of claim 1, wherein at least one reservable gaming machine is not eligible to be reserved by at least one class of player during a period of time.

6. The gaming system of claim 1, wherein the eligibility criteria for the current player to be eligible to reserve the gaming machine includes a player history of the current player.

7. The gaming system of claim 1, wherein the gaming system further includes a remote display, separate from the gaming machines and wherein the server system causes the remote display to display information indicative of the status of the reservation on one or more of the gaming machines.

8. A gaming system comprising a server system communicably connected to a plurality of gaming machines, the gaming machines providing a game in which a player stakes a wager on the game and a plurality of symbols are selected and displayed on a display, and if a winning combination occurs during play of the game, the gaming machine awards an award, wherein at least one of said plurality of gaming machines comprises a user interface which includes apparatus to receive an identifier from a current player of the gaming machine and the gaming machine communicates the identifier with the server system, wherein upon operation of the user interface by the current player the gaming machine no longer operates to play a game for a reserve period, the ability to reserve the gaming machine being dependent on a variable characteristic of the player other than the number of credits in a credit meter of the gaming machine, and wherein when the reserve period expires, the server system causes a message to be sent to a portable device and wherein the gaming machine becomes unreserved so as to operate to play a game, in response to receipt of a signal from the portable device.

9. The gaming system of claim 8, wherein when one of the gaming machines is reserved, the server system causes a display remote from the gaming machine to display a status of the reservation of the gaming machine, including indicating on the display when the reservation period has expired.

10. The gaming system of claim 9, wherein the display remote from the gaming machine continues to display the status of the reservation of a gaming machine until the gaming machine becomes unreserved.

11. The gaming system of claim 8, wherein the system includes a plurality of remote displays and individual displays selectively display the reserve status of different gaming machines.

12. The gaming system of claim 11, wherein a said remote display displays the reserve status of a gaming machine reserved by a player in response to receipt of a player identifier for that player at an interface associated with the remote display.

* * * * *